United States Patent Office 2,768,216
Patented Oct. 23, 1956

2,768,216

THERMAL DEHYDROCHLORINATION OF BENZENE HEXACHLORIDE

Fred W. Schmitz, Terre Haute, Ind., assignor to Commercial Solvents Corporation, Terre Haute, Ind., a corporation of Maryland No Drawing. Application January 26, 1953,
Serial No. 333,352

5 Claims. (Cl. 260—650)

My invention relates to a method for producing polychloro-benzenes containing from two to five chlorine atoms per molecule from benzene hexachloride by means of thermal dehydrochlorination, and more particularly to a continuous method of carrying out such process.

It has long been known that when chlorine is added to benzene a mixture of stereo-isomeric forms of hexachlorocyclohexanes, commonly referred to as benzene hexachloride, is obtained. Of these stereo-isomers only the so-called gamma isomer has significant utility as an insecticide. Various methods have, therefore, been developed for separating the active gamma benzene hexachloride from the relatively inactive isomers. Much thought has accordingly been given to the problem of utilizing the relatively large amounts of insecticidally inactive benzene hexachlorides thus obtained. Conversion of the latter into polychloro-benzenes offers one of the most feasible methods of utilizing these materials.

In the past it has been the practice to produce polychloro-benzenes from polychloro-cyclohexanes such as benzene hexachloride by reacting the latter with aqueous or alcoholic caustic at room or elevated temperatures. It has also been known that polychloro-cyclohexanes such as benzene hexachloride may be dehydrochlorinated by the action of heat at moderate temperature with certain catalysts, such as aluminum chloride, to produce polychloro-benzenes, such as trichlorobenzene, tetrachlorobenzene, and pentachlorobenzene. I have now discovered that the conversion of benzene hexachloride to polychloro-benzenes containing from two to five chlorine atoms per molecule can be carried out by a purely thermal dehydrochlorination under relatively mild reaction conditions, and furthermore, that this dehydrochlorination can be carried out in a continuous operation.

Previously known processes for the conversion, and particularly the continuous conversion, of polychloro-cyclohexanes such as benzene hexachloride to polychloro-benzenes containing from two to five chlorine atoms per molecule have not been satisfactory. This has been due partly to the fact that benzene hexachloride when heated melts and with other solid particles plugs feed lines to the reaction vessels used. Vaporized benzene hexachloride also solidifies on any cooler surface and plugs the lines carrying the vapor. This tendency to plug feed lines has resulted in the necessity for frequent cleaning of the lines to remove the plugs and has made continuous operation exceedingly difficult. My process avoids these and other difficulties and operates as a completely continuous process.

Another advantage of my process is that it is operated at pressures considerably higher than atmospheric with great attendant economies in equipment design. These economies result from the increased volume of starting material which can be treated in reaction equipment of the same size as that operated at atmospheric pressure. Thus, a greater volume of products is obtained with no increase in reaction equipment capacity or change in design.

My new process for producing polychloro-benzenes containing from two to five chlorine atoms per molecule is carried out by introducing into a suitable pressure vessel a mixture of benzene hexachloride and a liquid polychloro-benzene medium, heating the said mixture in the reaction vessel at a temperature of from 300° to 650° C. until approximately 3 moles of hydrogen chloride are liberated per molecule of the benzene hexachloride and recovering and separating the resulting hydrogen chloride and polychloro-benzenes containing from two to five chlorine atoms per molecule.

The starting materials for my new continuous thermal dehydrochlorination reaction include all the presently known stereo isomers of benzene hexachloride. That is, the alpha, beta, gamma, delta, and epsilon isomers of hexachloro-cyclohexane all function in my process, and the yields of the various polychloro-benzenes are obtained within the same ranges irrespective of the particular stereo isomer used. My new process can accordingly be employed to convert any of the insecticidally inactive stereo isomers of benzene hexachloride, for which there are now few uses, into immediately useful products.

Continuous operation of my new process is realized by introducing into the reaction vessel benzene hexachloride in admixture with a liquid polychloro-benzene medium such as trichlorobenzene. The trichlorobenzene or other polychloro-benzene medium may consist of any polychloro-benzene in a form liquid at normal temperatures. That is, the medium may consist wholly or substantially of liquid trichloro-benzenes and liquid dichloro-benzenes (o or m dichloro-benzenes). The medium may consist of 1,2,4-trichlorobenzene, which has a melting point of 17° C. when pure, and mixtures of the 1,2,4 isomer with either or both of the other two isomers of trichlorobenzene, namely 1,2,3-trichlorobenzene and 1,3,5-trichlorobenzene. Though pure liquid dichlorobenzene and trichlorobenzenes or liquid mixtures consisting substantially of these polychloro-benzenes may be used, I prefer to employ a trichlorobenzene medium to simplify the final separation since trichlorobenzene is the chief product realized in my process.

A convenient source of a trichlorobenzene medium is the crude product of the dehydrochlorination of benzene hexachloride which is made up of from 80% to 85% trichlorobenzene. Infrared spectrographic analysis has shown the following distribution of the three isomers of trichlorobenzene in the product of the dehydrochlorination of benzene hexachloride: 1,2,4-trichlorobenzene 80% to 85%, 1,2,3-trichlorobenzene 14.7% to 19.7%, and 1,3,5-trichlorobenzene 0.3% to 0.5%.

The liquid medium for use in my process can be formed by mixing the benzene hexachloride starting material with the trichlorobenzene or other liquid polychloro-benzene medium as a slurry, or by dissolving the starting material in the trichlorobenzene medium. The benzene hexachloride and the trichlorobenzene or other polychlorobenzene medium can be combined through a wide range of proportions so long as the result is a fluid medium. I have found that a cold slurry consisting of 40% benzene hexachloride in 60% of the trichlorobenzene composition produced from benzene hexachloride forms an easily fed, non-clogging mixture. I have also found that a hot solution of 60% benzene hexachloride in 40% of the crude trichlorobenzene composition is a satisfactory, solid-free reaction mixture. These proportions are given merely by way of illustration and can be varied throughout a wide range with either component in excess.

My method of operation makes possible the use of increased pressures. The use of pressure in earlier processes where benzene hexachloride and other solid polychloro-cyclohexanes were employed intensified the line-plugging difficulties since pressure caused the vaporized polychloro-cyclohexanes to reach cool surfaces of the feeding mechanisms more readily. Hence, in order to minimize these difficulties, increased pressures were avoided. Pressure operation is extremely advantageous because of equipment economies resulting therefrom. An additional advantage of operation at increased pressures is the fact that the hydrogen chloride vapor produced by the conversion can be recovered in dry form in surge tanks or like pressure vessels for subsequent use in numerous reactions.

My process can be carried out at temperatures ranging from about 300° to about 650° C. However, I prefer to operate my process at from about 450° to about 550° C.

My process can be carried out at pressures ranging up to 10 atmospheres. I prefer to operate my process at elevated pressures ranging from about 2 to about 10 atmospheres. Such operation at elevated pressures results in a positively controlled continuous process free from plugging difficulties and producing both the desired polychloro-benzenes containing from two to five chlorine atoms per molecule and hydrogen chloride gas in dry form.

The residence time within the reaction vessel necessary for complete conversion to polychloro-benzenes is dependent upon the temperature of the reaction and the design and operation of the reaction vessel. However, in general, it may be said that at the preferred range of temperature, 450° to 550° C., the residence time necessary for complete conversion ranges from about 5 to 10 seconds. At temperatures in the neighborhood of 300° C. the residence time must be increased to 20 to 30 or more seconds, whereas when the temperature is raised to the order of 650° C. a residence time of only some 2½ to 4 seconds is required for complete conversion. The rate at which the benzene hexachloride is introduced into the reaction vessel will depend upon the temperature and pressure at which the system is maintained. Reaction conditions should be selected so as to give the necessary residence time within the reaction vessel required for complete conversion. Brief experimentation will enable one skilled in the art to establish the rate of feeding, and pressure combination which will give the residence time required by a particular reaction vessel design and operating temperature.

Any reaction vessel which can be maintained at the desired temperature and pressure and which provides the necessary residence time at that temperature can be employed in my process. I have found that a stainless steel U-tube packed with stainless steel Raschig rings forms a very efficient reaction vessel. The U-tube reactor employed in the examples set out below consisted of a stainless steel pipe two inches in diameter with 55 inches of its length immersed in molten sodium hydroxide maintained at the desired reaction temperature. This tube, forming an elongated reaction zone, was packed with stainless steel Raschig rings for the entire length of the tube immersed in the heating bath and contained a free space of 0.0932 cubic foot. Any reaction vessel of suitable design for a vapor phase reaction involving chlorine and hydrogen chloride is suitable for use in my process.

The following examples are offered to illustrate my invention and it is understood that I do not intend to be limited to the exact amounts and procedures set forth therein. The scope of this invention is as defined in this specification and the attached claims and I intend for all equivalents thereof apparent to those skilled in the art to be specifically included within the said scope.

EXAMPLE I

The following five runs using a cold fluid slurry of 40% benzene hexachloride in 60% trichlorobenzene product were made at various residence times and all gave essentially the same product distribution. The runs were all made with the 2-inch stainless steel U-tube reaction vessel described above and all runs were conducted at 3 atmospheres absolute (30 p. s. i. g.) pressure. A water-cooled precooler, a water-cooled condenser, and a jacketed receiver-separator were employed for condensation and collection of the crude trichlorobenzenes. A packed column water scrubber was used after the receiver-separator for dissolving the effluent hydrogen chloride gas. A back pressure regulating valve was installed in the product gas line before this water scrubber to lower the pressure within the scrubber to atmospheric. The reaction conditions and results of each of the five runs are summarized in Table I below.

*Table I*

| Run | 1 | 2 | 3 | 4 | 5 |
|---|---|---|---|---|---|
| Av. NaOH Bath Temp., °C | 504 | 503 | 505 | 502 | 506 |
| Feed, lbs | 47.7 | 80.3 | 68.1 | 95.2 | 86.5 |
| BHC, lbs | 19.1 | 32.1 | 27.2 | 38.1 | 34.6 |
| Reactor Pressure, p. s. i. g | 30 | 30 | 30 | 30 | 30 |
| Residence time, secs | 10.8 | 6.4 | 5.0 | 4.9 | 3.6 |
| Crude Product (less weight of TCB carrier), lbs | 12.8 | 25.6 | 18.7 | 21.8 | 22.6 |

CRUDE PRODUCT PERCENTAGE COMPOSITION UPON FRACTIONATION

| | | | | | |
|---|---|---|---|---|---|
| HCl, percent | 0.3 | 0.3 | 0.6 | 0.3 | 0.3 |
| Water, (est.) percent | 0.2 | 0.2 | 0.2 | 0.2 | 0.2 |
| Dichlorobenzene, percent | 7.4 | 7.9 | 7.3 | 8.0 | 9.7 |
| Trichlorobenzene, percent | 82.0 | 81.6 | 81.4 | 82.8 | 83.0 |
| High Boilers, percent | 5.8 | 7.4 | 5.9 | 6.0 | 6.8 |
| Unaccounted for Loss, percent | 4.3 | 2.6 | 4.6 | 2.7 | 0.0 |
| Trichlorobenzene Yield, percent | 88.2 | 104.2 | 89.9 | 76.1 | 86.9 |
| HCl Recovered, lbs | 7.16 | 11.95 | 10.75 | 14.91 | 13.16 |
| Molal Yield HCl, percent | 99.5 | 98.9 | 105.0 | 103.1 | 101.0 |

EXAMPLE II

In the production of the concentrated gamma isomer of benzene hexachloride one by-product is a mixture of benzene hexachloride isomers and heptachlorocyclohexane in the form of a heavy oil which solidifies after several days. This mixture is known as delta oil and analyses of the mixture show the following ranges of constituents: alpha benzene hexachloride 6 to 11%, gamma benzene hexachloride 8 to 20%, delta benzene hexachloride 38 to 53%, and heptachlorocyclohexane 25 to 35%. Twenty pounds of delta oil was dissolved in 20 pounds of trichlorobenzene product and dehydrochlorinated at 500° C. reactor bath temperature and 10 seconds' residence time under a pressure of 30 p. s. i. g. in the same equipment described in Example I above. A product was recovered totaling 25.8 pounds including the trichlorobenzene composition used to make the 50% solution. A 2260 gm. sample of this product was fractionated to determine the distribution of polychlorobenzenes formed. It was found that the product contained 6.6% tetrachlorobenzene, 9.2% dichlorobenzene and 84.2% trichlorobenzene.

Now having described my invention what I claim is:

1. The process which consists essentially in continuously passing a fluid mixture of benzene hexachloride and a liquid polychloro-benzene medium which is liquid at normal temperatures, consisting essentially of at least one liquid polychloro-benzene selected from the class consisting of trichloro- and dichloro-benzenes, under a pressure of from about 2 to 10 atmospheres, to and through an elongated reaction zone heated to temperatures ranging from about 300° to 650° C. at a rate causing the liberation of approximately 3 moles of HCl per mole of benzene hexachloride, and continuously recovering the resulting polychloro-benzene product.

2. The process of claim 1 wherein the temperature in the reaction zone ranges from about 450° to 550° C. and the residence time in the reaction zone is from about 10 to 5 seconds.

3. The process of claim 1 wherein the benzene hexachloride is introduced into the reaction zone in the form of a slurry in said liquid polychloro-benzene medium.

4. The process of claim 1 wherein the benzene hexachloride is introduced into the reaction zone in the form of a solution of delta oil in said liquid polychlorobenzene medium.

5. The process which consists essentially in continuously passing a solution of delta oil in a polychlorobenzene medium, which is the product resulting from the process, under a pressure of from about 2 to 10 atmospheres, to and through an elongated reaction zone heated to temperatures ranging from about 300° to 650° C. at a rate causing the liberation of approximately 3 moles of HCl per mole of the benzene hexachloride in the feed, and continuously recovering the resulting polychlorobenzene product.

References Cited in the file of this patent

UNITED STATES PATENTS

| | | |
|---|---|---|
| 2,569,441 | Alquist et al. | Oct. 2, 1951 |
| 2,737,531 | Churchill | Mar. 6, 1956 |

FOREIGN PATENTS

| | | |
|---|---|---|
| 955,816 | France | July 4, 1949 |
| 1,018,738 | France | Oct. 15, 1952 |